(No Model.)

W. THOMPSON.
STOVE GRATE.

No. 577,467.  Patented Feb. 23, 1897.

Witnesses:
E. R. Shipley.
M. S. Belden.

William Thompson
Inventor
by James W. See
Attorney

UNITED STATES PATENT OFFICE.

WILLIAM THOMPSON, OF ST. LOUIS, MISSOURI, ASSIGNOR TO THE BUCK'S STOVE AND RANGE COMPANY, OF SAME PLACE.

STOVE-GRATE.

SPECIFICATION forming part of Letters Patent No. 577,467, dated February 23, 1897.

Application filed October 19, 1896. Serial No. 609,285. (No model.)

*To all whom it may concern:*

Be it known that I, WILLIAM THOMPSON, of St. Louis, Missouri, have invented certain new and useful Improvements in Stove-Grates, of which the following is a specification.

This invention pertains to improvements in shaking-grates, which improvements will be readily understood from the following description, taken in connection with the accompanying drawings, in which—

Figure 1:
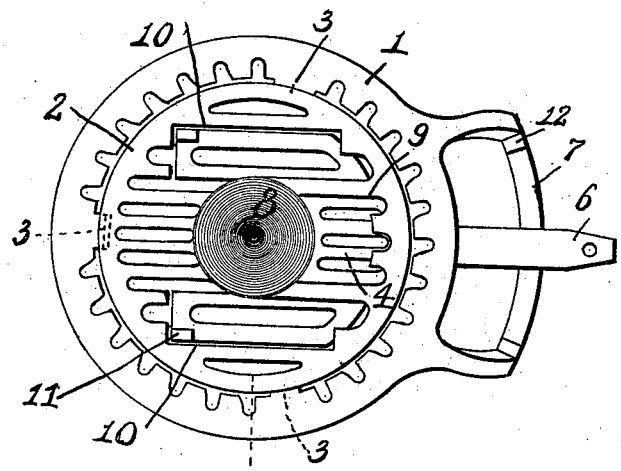
Figure 2:
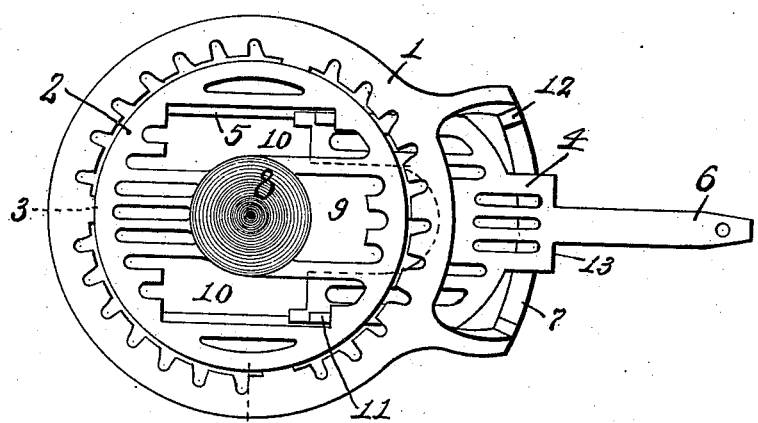
Figure 3:
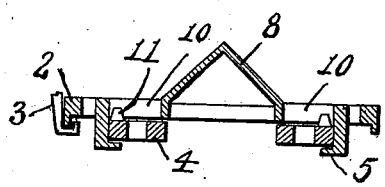

Figure 1 is a plan of my improved grate, showing the parts in normal position; Fig. 2, a plan with the subgrate drawn out to permit the dropping of clinkers, and Fig. 3 a vertical transverse section in the plane of the dotted line seen in Figs. 1 and 2.

In the drawings, 1 indicates the usual circular grate-ring of a stove, having the usual spurs projecting inwardly to near the periphery of the circular shaking-grate; 2, the circular shaking-grate supported within the grate-ring; 3, the usual claws projecting inwardly from the grate-ring to furnish bearings for the shaking-grate 2; 4, the subgrate disposed in guides below grate 2 and shaking with it and adapted for outward movement, the subgrate normally occupying a position under the main grate, as seen in Fig. 1; 5, the usual guides formed below the main grate for the support and guidance of the subgrate; 6, the usual shake-bar projecting outwardly from the front of the subgrate in position to receive a shake-handle applied at the ash-pit door of the stove, to serve in shaking the grates and in sliding the subgrate; 7, the usual rest-bar supported by and at the front of the grate-ring 1 and under the shake-bar 6, to furnish a bearing for the shake-bar during the shaking motion; 8, a cone formed upon the top of main grate 2 at the center thereof; 9, a large opening through main grate 2 in front of cone 8, this opening being formed by the omission of grate-bars from the main grate at this point; 10, large openings through the main grate 2 at each side of cone 8 and formed by omitting grate-bars from the main grate at those points; 11, stop-lugs projecting upwardly from the subgrate into the openings 10 and engaging the ends of those openings at the terminals of the sliding motion of the subgrate; 12, stops projecting upwardly from rest-bar 7 and limiting the oscillating motion of shake-bar 6, and 13 outwardly-presenting shoulders formed at the juncture of shake-bar 6 with grate 4 and adapted, when the grate is at either extremity of its oscillation, to come inwardly behind stops 12 and limit the outward sliding motion of the subgrate.

Normally the parts occupy the position shown in Fig. 1, a complete grating being formed around cone 8, which cone directs the ashes and clinkers outwardly to the slotted portions of the grate and to the openings formed around the grate at the inner margin of grate-ring 1, the rotary shaking of the grate serving to discharge fine matter through the grate and through the openings just outside the grate, much of the coarser matter becoming crushed or ground up at the spurs of the grate-ring and passing out through the openings between those spurs. By drawing out the subgrate to the position shown in Fig. 2 the large openings 9 and 10 permit the discharge of clinkers not crushed and too large to pass through the grating-slots, cone 8 directing these matters to the large discharge-opening. The subgrate may be drawn out to the position shown in Fig. 2 when at its central position of oscillation, but when at either extremity of its oscillation it may be drawn out only a limited distance, as determined by a shoulder 13 coming in contact with a stop-lug 12. Such partial withdrawal of the subgrate produces the more limited area for discharge-openings 9 and 10. Thus the subgrate need not be drawn out at all if the matter to be discharged will pass through the grating, and for somewhat coarser matter the grate may be moved to one extremity of its oscillation and the subgrate drawn out to partially open the large discharge-openings and discharge the matter without danger of producing too free a discharge, and for extra large matter the grate, while in central position, may have the subgrate withdrawn to give full area to the large discharge-openings, the central cone at all times directing the material to the large discharge-openings and at the same time preventing access of air to the center of the fire and causing an annular distribution of the air-supply.

I claim as my invention—

In a grate, the combination, substantially as set forth, of a shaking main grate having a centrally-disposed cone upon its upper surface and having large discharge-openings at the base of the cone, and a subgrate supported by and sliding in guides under the main grate and shaking with the main grate and having gratings normally closing said discharge-openings and adapted for sliding withdrawal to leave those discharge-openings free.

WILLIAM THOMPSON.

Witnesses:
THEO. C. BECKE,
MAURICE A. MURRAY.